(12) United States Patent
Takahashi

(10) Patent No.: US 10,598,138 B2
(45) Date of Patent: Mar. 24, 2020

(54) HERMETICALLY SEALED TANK SYSTEM

(71) Applicant: AISAN KOGYO KABUSHIKI KAISHA, Obu-shi, Aichi-ken (JP)

(72) Inventor: Hiroyuki Takahashi, Nagoya (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 187 days.

(21) Appl. No.: 15/972,413

(22) Filed: May 7, 2018

(65) Prior Publication Data

US 2018/0335003 A1  Nov. 22, 2018

(30) Foreign Application Priority Data

May 17, 2017 (JP) .................................. 2017-098144

(51) Int. Cl.

| F02M 37/00 | (2006.01) |
|---|---|
| F16K 17/04 | (2006.01) |
| B60K 15/035 | (2006.01) |
| G05D 16/18 | (2006.01) |
| F16K 17/08 | (2006.01) |

(Continued)

(52) U.S. Cl.
CPC ... *F02M 37/0052* (2013.01); *B60K 15/03504* (2013.01); *B60K 15/03519* (2013.01); *F02M 37/0029* (2013.01); *F02M 37/0082* (2013.01); *F02M 69/54* (2013.01); *F16K 17/0413* (2013.01); *F16K 17/085* (2013.01); *G05D 16/185* (2013.01); *B60K 2015/03514* (2013.01); *B60K 2015/03557* (2013.01); *F02M 25/089* (2013.01)

(58) Field of Classification Search
CPC ........... F02M 37/0029; F02M 37/0052; F02M 37/0082; F02M 69/54; B60K 15/03504; B60K 15/03519; B60K 2015/03557; G05D 16/185
USPC ........................................ 123/506, 513, 514
See application file for complete search history.

(56) References Cited

U.S. PATENT DOCUMENTS

| 3,520,320 A * | 7/1970 | Crawford ................ F01N 3/227 |
|---|---|---|
| | | 137/115.14 |
| 3,955,396 A * | 5/1976 | Carrieri ................. B30B 15/284 |
| | | 72/432 |

(Continued)

FOREIGN PATENT DOCUMENTS

| JP | H08109862 A | 4/1996 |
|---|---|---|
| JP | 2002235622 A | 8/2002 |

(Continued)

*Primary Examiner* — Erick R Solis
(74) *Attorney, Agent, or Firm* — Conley Rose, P.C.

(57) ABSTRACT

A hermetically sealed fuel tank system includes a hermetically sealed fuel tank, a fuel pump configured to supply fuel from within the hermetically sealed fuel tank to an internal combustion engine, and a pressure regulating valve. The pressure regulating valve is disposed within the hermetically sealed fuel tank and is configured to regulate the fuel pressure of the fuel supplied from the fuel pump to the internal combustion engine. The pressure regulating valve includes a pressure regulating chamber and a backpressure chamber partitioned by a diaphragm. An ambient air introduction passage is fluidly connected to the backpressure chamber and is configured to introduce air from the atmosphere outside the fuel tank into the backpressure chamber.

20 Claims, 4 Drawing Sheets

(51) Int. Cl.
*F02M 69/54* (2006.01)
*F02M 25/08* (2006.01)

(56) References Cited

U.S. PATENT DOCUMENTS

| | | | | |
|---|---|---|---|---|
| 4,237,849 A | * | 12/1980 | Roberts | F02M 37/0029 123/511 |
| 5,558,063 A | | 9/1996 | Minagawa et al. | |
| 2009/0151703 A1 | * | 6/2009 | Ikeya | F02M 37/0029 123/506 |
| 2009/0308357 A1 | * | 12/2009 | Kono | F02M 5/12 123/514 |

FOREIGN PATENT DOCUMENTS

| | | |
|---|---|---|
| JP | 2003035231 A | 2/2003 |
| JP | 2016121674 A | 7/2016 |

\* cited by examiner

HERMETICALLY SEALED TANK SYSTEM

CROSS-REFERENCE TO RELATED APPLICATIONS

This application claims priority to a Japanese patent application serial number 2017-098144 filed May 17, 2017, which is hereby incorporated herein by reference in its entirety for all purposes.

STATEMENT REGARDING FEDERALLY SPONSORED RESEARCH OR DEVELOPMENT

Not applicable.

BACKGROUND

The present disclosures relate to hermetically sealed tank systems.

An internal combustion engine for a vehicle such as an automobile communicates with a fuel tank. In particular, in such vehicles, a canister which communicates with the fuel tank is known in the art. The canister contains adsorbent materials to adsorb fuel vapor in order to prevent the fuel vapor from diffusing into the atmosphere outside of the fuel tank. More specifically, the canister communicates with the space above the liquid level in the fuel tank. The canister captures the fuel vapor from this space when the gas within the fuel tank containing the fuel vapor is exhausted into the canister, so that only the air is discharged into the atmosphere.

Recently, in order to more reliably prevent fuel vapor from diffusing into the atmosphere, a hermetically sealed tank system having a fuel tank with a hermetically sealed structure has been introduced (for example, Japanese Laid-Open Patent Publication No. 2003-35231). In such a hermetically sealed tank system, the space above the liquid level in the fuel tank communicates with a canister via a vapor passage. The fuel tank is hermetically sealed when a closing valve provided in this vapor passage is closed. The closing valve is opened only when the conditions for opening the valve are met at a certain point in time, e.g. during oil feeding. When the closing valve is opened, the fuel vapor in the fuel tank is able to be exhausted into the canister via the vapor passage.

In a typical fuel tank, there is a fuel supply device for feeding fuel in the fuel tank to an internal combustion engine. Such a fuel supply device conventionally comprises a fuel pump, a fuel filter and pressure regulating valve etc. The fuel filter is configured to filter the fuel drawn into the fuel pump. The fuel pump pumps the fuel to the internal combustion engine. The pressure regulating valve regulates the pressure of the fuel (fuel pressure) supplied from the fuel pump to the internal combustion engine. In such devices, a diaphragm valve with a diaphragm is widely used as a pressure regulating valve. The diaphragm of the diaphragm valve partitions the interior space of the diaphragm valve into a pressure regulating chamber and a backpressure chamber. The diaphragm valve is configured to regulate the fuel pressure in the pressure regulating chamber in accordance with the fluid pressure in the backpressure chamber. Typically, the backpressure chamber communicates with the fuel tank, and more specifically with the aforementioned space above the liquid level in the fuel tank. As a result, due to the communication, the pressure within the backpressure chamber equalizes to become the same as the pressure in the space above the liquid level, i.e., the internal pressure of the fuel tank. In this way, the pressure regulating valve regulates the fuel pressure using the internal pressure of the fuel tank.

The space above the liquid level in the fuel tank perpetually communicates with the atmosphere via a canister if the fuel tank is configured in a non-hermetically sealed type configuration. Thus, the internal pressure of the fuel tank equalizes to the ambient pressure. Consequently, the pressure within the backpressure chamber of the pressure regulating valve is also maintained at atmospheric pressure when the fuel supply device is actuated. As a result, the pressure of the fuel supplied to an internal combustion engine can be regulated at a predetermined preset pressure relative to the ambient pressure.

On the other hand, in a hermetically sealed tank system, the fuel tank is typically hermetically sealed except for occasional opening of a limited duration. Therefore, the internal pressure of the fuel tank may be higher or lower than the atmospheric pressure, in contrast to the fuel tank described above. If the fuel supply device is driven in such conditions, the pressure in the backpressure chamber of the pressure regulating valve can consequently also be higher or lower than the ambient pressure. Accordingly, the fuel pressure regulated by the pressure regulating valve may vary in accordance with the pressure in the backpressure chamber. As a result, the fuel pressure deviates from the preset pressure value.

In this context, a hermetically sealed tank system is desired that includes a pressure regulating valve capable of regulating the fuel pressure on the basis of the ambient pressure, without being affected by the internal pressure in the fuel tank.

SUMMARY

According to one aspect of the present disclosure, a hermetically sealed tank system may include a hermetically sealed-type fuel tank, a fuel pump configured to supply fuel in the fuel tank to an internal combustion engine, and a pressure regulating valve. The pressure regulating valve is arranged in the fuel tank and is configured to regulate pressure of the fuel supplied from the fuel pump to the internal combustion engine. The pressure regulating valve includes a pressure regulating chamber and a backpressure chamber that are partitioned by a diaphragm. An ambient air introduction passage is connected to the backpressure chamber and is configured to introduce air from outside of the fuel tank into the backpressure chamber.

According to this configuration, ambient air is introduced into the backpressure chamber of the pressure regulating valve through the ambient air introduction passage. Consequently, the pressure in the backpressure chamber equalizes to become the same pressure as the ambient air. As a result, the pressure regulating valve can regulate the fuel pressure at a predetermined preset pressure value on the basis of the ambient pressure without affecting the internal pressure in the hermetically sealed-type fuel tank.

According to another aspect of the present disclosure, the hermetically sealed tank system may include a canister configured to adsorb and desorb fuel vapor. The ambient air introduction passage may communicate with the ambient air from the outside via the canister. With this configuration, the backpressure chamber of the pressure regulating valve communicates with the ambient air from the outside of the tank via the canister. Accordingly, even if the fuel passes from the pressure regulating chamber through the diaphragm and leaks into the backpressure chamber, the fuel vapor formed by vaporization of the leakage can be adsorbed by the canister. Thus, the leaked fuel vapor may be prevented from dissipating into the atmosphere.

According to another aspect of the present disclosure, the hermetically sealed tank system may include a cover configured to cover an opening of the fuel tank. A part of the ambient air introduction passage may be formed through the cover. With this configuration, the ambient air introduction passage may extend from the outside to the inside of the hermetically sealed fuel tank through the cover. Therefore, provision of the ambient air introduction passage can be easily arranged compared to the case where the ambient air introduction passage is arranged on another part of the hermetically sealed fuel tank, for example, where the air introduction passage extends from the inside to the outside of the hermetically sealed fuel tank via a wall on the body of the tank, as opposed to a cover. Furthermore, since by being located within the cover, it is not necessary to provide a new opening for the ambient air introduction passage, a new sealing member is also not necessary. As a result, the integral structure of the tank is fortified, and a reduction in airtightness of the fuel tank is prevented.

DETAILED DESCRIPTION

Hereinafter, exemplary embodiments will be described with reference to the drawings. A hermetically sealed tank system according to the present embodiment is adopted to be used as a fuel vapor processing device for a vehicle, such as an automobile. The "upstream" and "downstream" in the present specification are defined on the basis of the flow direction of the fluid in the system.

Figure 1:
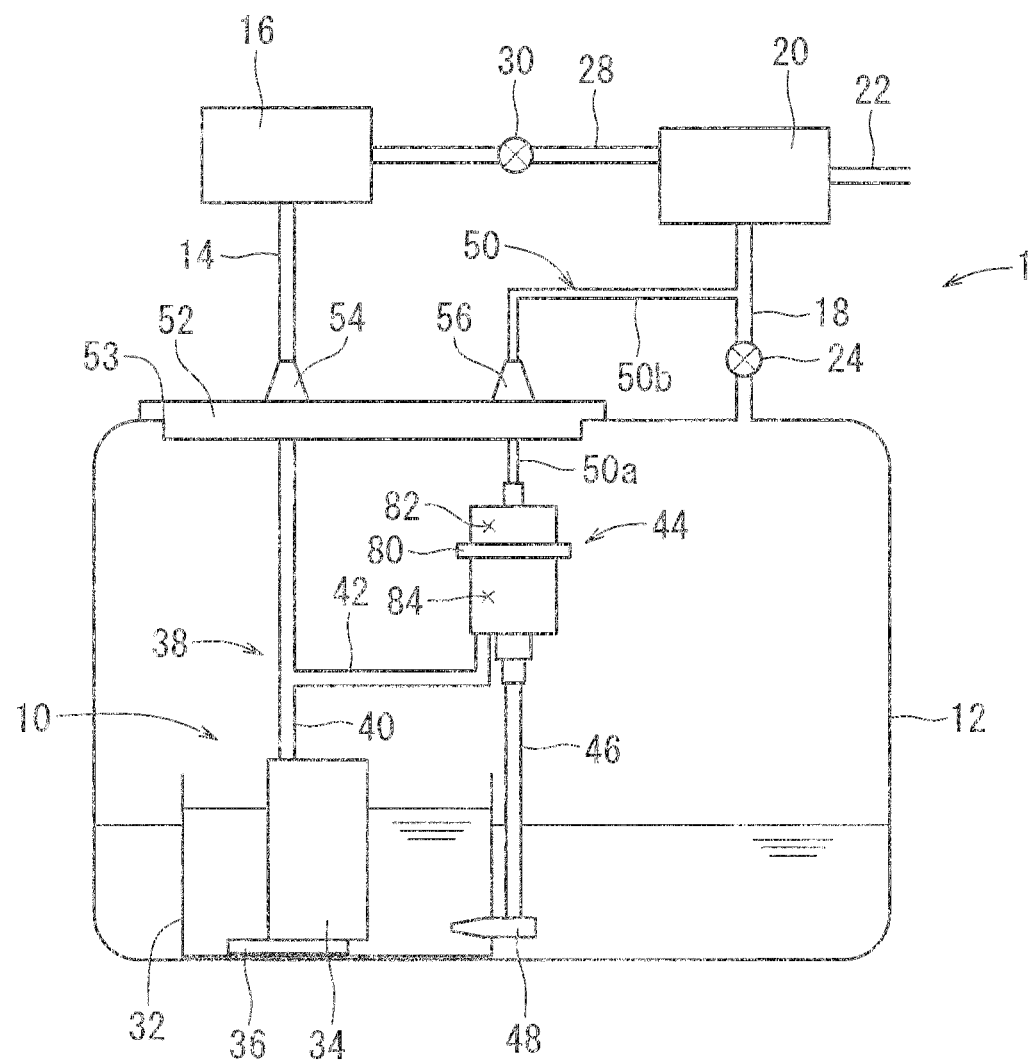
FIG. 1 is a schematic view of an embodiment of a hermetically sealed tank system.

Referring now to FIG. 1, an embodiment of a hermetically sealed tank system 1 is shown. In this embodiment, the hermetically sealed tank system 1 includes a fuel supply device 10 disposed within a hermetically sealed-type fuel tank 12. The fuel supply device 10 serves to supply fuel from within the hermetically sealed-type fuel tank 12 via a fuel supply passage 14 to an internal combustion engine (engine) 16. Vapor within a space above the liquid surface level in the hermetically sealed-type fuel tank 12 forms a gas layer in selective fluid communication with the canister 20 via a vapor passage 18. The canister 20 is filled with adsorbent materials (not shown) such as activated carbon. The contained adsorbent materials adsorb and desorb the fuel vapor from the vapor passage 18. An atmospheric passage 22 is also fluidly connected to the canister 20, which allows the canister 20 to fluidly communicate with the atmosphere outside of the fuel tank 12. A closing valve 24 is provided in the vapor passage 18 to open and close the vapor passage 18. The closing valve 24 is controlled to open and close by an electronic control unit (ECU) (not shown). The canister 20 is fluidly connected to the engine 16 via a purge passage 28. A purge valve 30 is provided in the purge passage 28 to open and close the purge passage 28. The purge valve 30 is also controlled to open and close by the aforementioned ECU.

In the hermetically sealed tank system 1, the closing valve 24 is opened and closed in accordance with the state of operation of the vehicle, designated by numerals 1-3, as follows:

1) When the vehicle is parked, then the closing valve 24 is maintained in a closed state. The closing of the valve 24 results in the hermetically sealed-type fuel tank 12 being maintained in a hermetically sealed state such that the fuel vapor generated is restricted from exiting in the fuel tank 12.

2) When oil is being fed into the vehicle, the closing valve 24 is opened prior to the oil feeding. Due to the valve 24 opening in such a manner, the fuel vapor present flows from the hermetically sealed-type fuel tank 12 into the canister 20 through the vapor passage 18, and is thereafter adsorbed by the canister 20 during oil feeding. After oil feeding, the closing valve 24 is closed in response to a signal(s) from the ECU such that the hermetically sealed fuel tank 12 is hermetically sealed.

3) When the state of operation of the vehicle is such that the engine 16 is driven, the closing valve 24 is typically maintained in the closed. However, when a predetermined purge condition is met while the engine 16 is still being driven, a purge control (controlled opening of the purge valve 30) is executed by the aforementioned ECU to purge the fuel vapor adsorbed in the canister 20 from the canister 20. Outside air, from outside the tank 12, flows from the atmospheric passage 22 into the canister 20 due to the intake air negative pressure of the engine 16 resulting from when the purge valve 30 is opened. The fuel vapor in the canister 20 is purged and supplied to the engine 16 along with the inflow of outside air through the purge passage 28. When a predetermined pressure release condition is met, the closing valve 24 may be opened when the purge control is being executed, such that the pressure built up within the hermetically sealed-type fuel tank 12 is released.

Hereinafter, the fuel supply device 10 will be described. As shown in FIG. 1, the fuel supply device 10 may include a reservoir cup 32 and a fuel pump 34 arranged within the reservoir cup 32. The fuel pump 34 is a motor-integrated type fuel pump that serves to supply fuel from within the reservoir cup 32 to the internal combustion engine 16. A fuel filter 36 configured to filter out impurities from the fuel is provided at a fuel inlet port of the fuel pump 34. The fuel inlet port is oriented at the lower-most edge of the fuel pump 34, wherein the fuel filter 36 is disposed immediately adjacent to and below the fuel pump 34 such that it covers the fuel inlet port.

A fuel pipe 38 is connected to a fuel outlet port of the fuel pump 34. A fuel passage 40 and a branch passage 42 branching off extend from the fuel passage 40 form sub-components of the fuel pipe 38. The fuel outlet port is oriented such that it is located at the upper edge of the fuel pump 34, while the fuel passage 40 extends upward from the fuel outlet port of the fuel pump 34. A pressure regulating valve 44 is fluidly connected to the branch passage 42. A return passage 46 is fluidly connected to the pressure regulating valve 44, while a jet pump 48 is provided at the lower end of the return passage 46. A lower branched end 50a of the ambient air introduction passage 50 is fluidly connected to a pressure regulating valve 44, and more specifically is connected to the backpressure chamber 82 of the pressure regulating valve 44. An opposite end from 50a of the ambient air introduction passage 50 is fluidly connected to the vapor passage 18 downstream of the closing valve 24.

The hermetically sealed type fuel tank 12 may include an opening 53 on its upper surface through which the fuel supply device 10 is inserted into and arranged inside. The opening 53 of the hermetically sealed-type fuel tank 12 is hermetically sealed with a cover 52. A fuel port 54 and an ambient air introduction port 56 are configured to communicate with the inside and with the outside of the hermetically sealed-type fuel tank 12, respectively, and may be formed on and within the cover 52. The fuel passage 40 includes the vertical portion above and below branch passage 42 as shown in FIG. 1, and the fuel supply passage 14, are both fluidly connected to the fuel port 54 on opposite vertical ends. The ambient air introduction port 56 defines a part of the ambient air introduction passage 50. More specifically, the ambient air introduction passage 50 includes a first ambient air introduction pipe 50a, an ambient air introduction port 56, and a second ambient air introduction pipe 50b. The first ambient air introduction pipe 50a and the second ambient air introduction pipe 50b are fluidly connected to the ambient air introduction port 56 on opposite vertical ends. The first ambient air introduction pipe 50a is fluidly connected with the backpressure chamber 82 of the pressure regulating valve 44. The second ambient air introduction pipe 50b is fluidly connected with the vapor passage 18. The first ambient air introduction pipe 50a and the second ambient air introduction pipe 50b are formed of a flexible tube such as a nylon tube to facilitate pipe laying/assembly.

Figure 2:
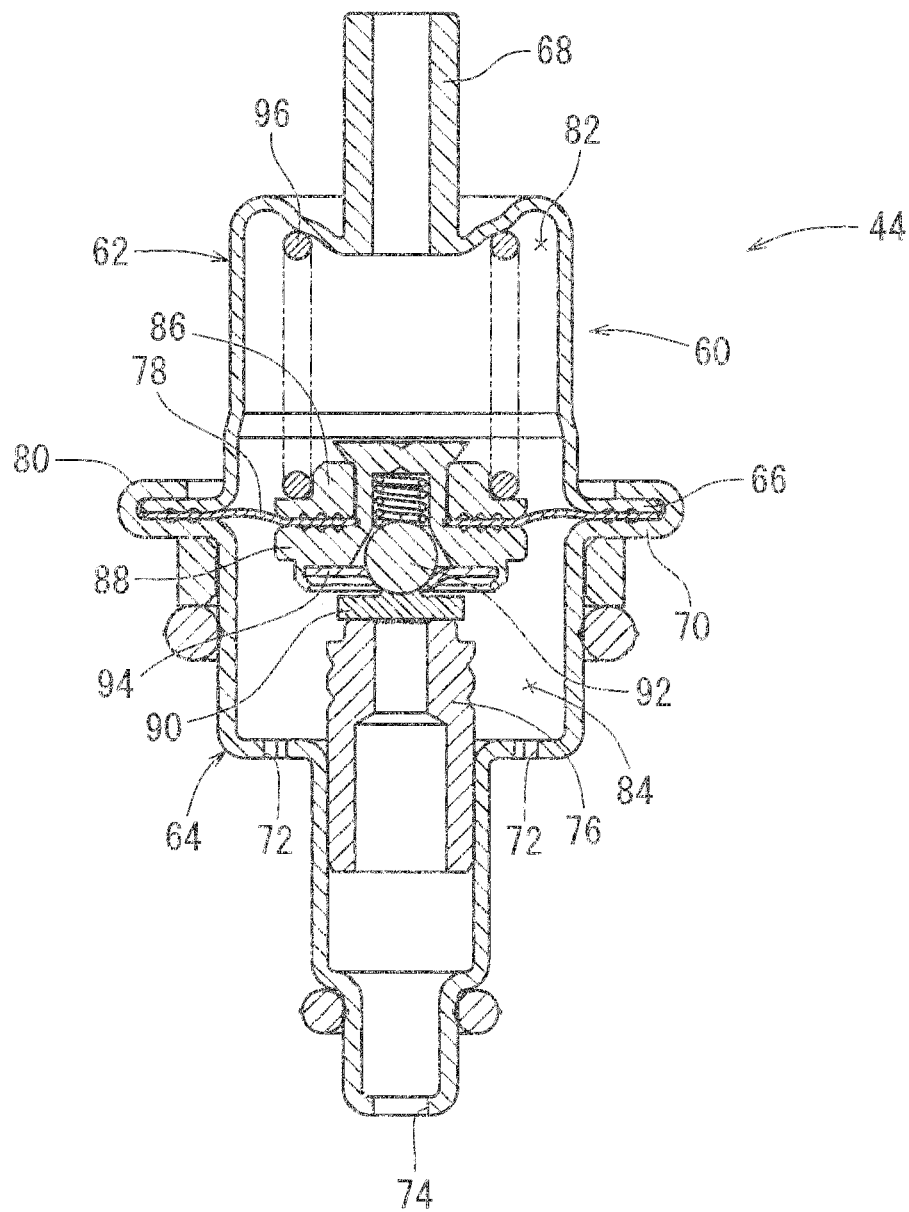
FIG. 2 is a cross sectional view of the pressure regulating valve of FIG. 1 in a closed state.
Figure 3:
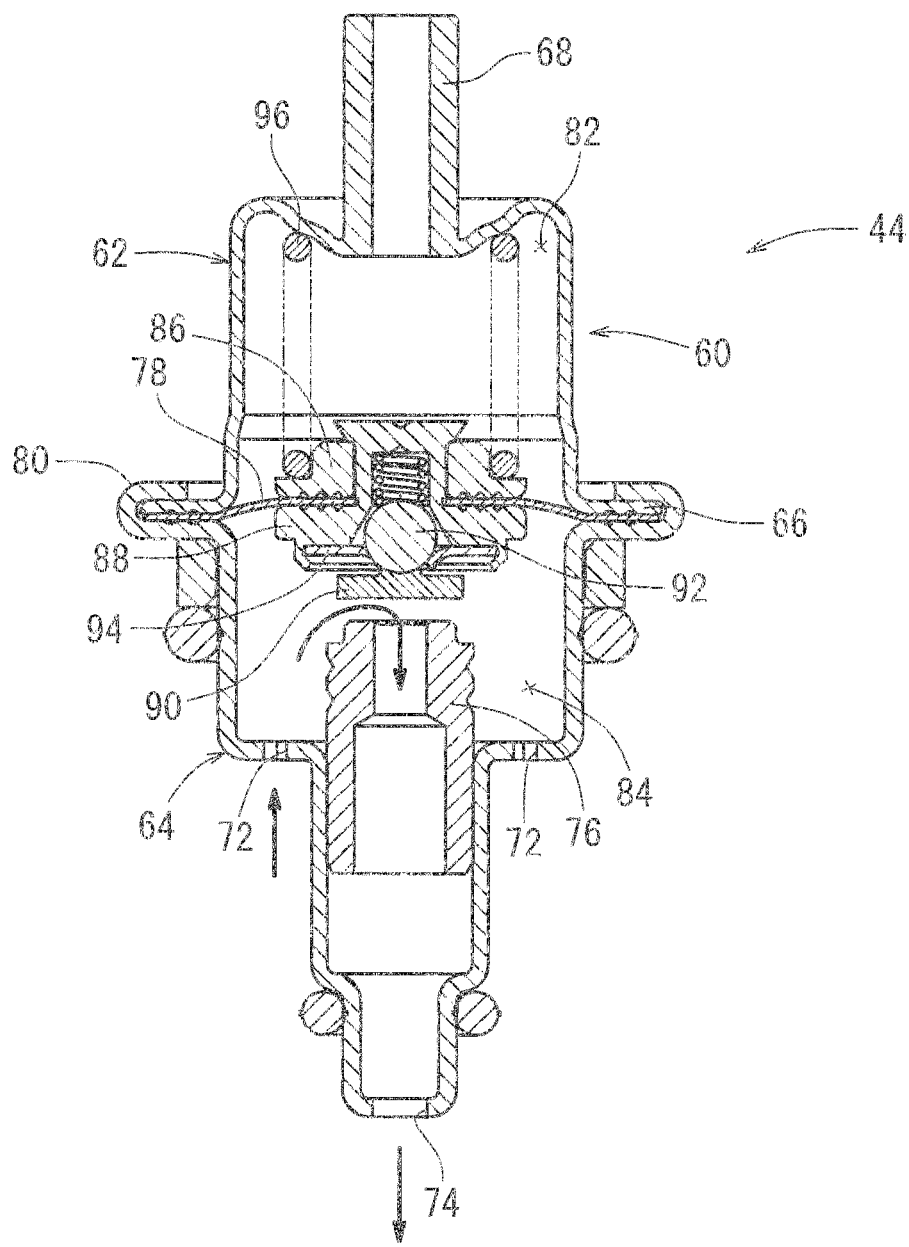
FIG. 3 is a cross sectional view of the pressure regulating valve of FIG. 1 in an opened state.

The pressure regulating valve 44 may be a diaphragm type pressure regulating valve configured to adjust the fuel pressure in the fuel passage 40 to a predetermined preset pressure. For the sake of convenience of explanation, the vertical direction of the pressure regulating valve 44 is determined with respect to the orientation of the figure shown in FIG. 2. However, alternate arrangement directions and orientations of the pressure regulating valve 44 may be employed. As shown in FIGS. 2 and 3, the pressure regulating valve 44 may include a hollow cylindrical casing 60. The casing 60 is composed of a first case half 62 and a second case half 64, which are configured as upper and lower parts of the casing 60, respectively, and which are divided horizontally as seen in FIG. 2. Both case halves 62 and 64 are formed of a press-molded product made of metal such as iron. The first case half 62 is configured to have a cylindrical form with a top whose interior cavity is open from the bottom. An annular flange 66 extends radially outward from the bottom of the lower end of the first case half 62. A cylindrical vent port 68 is formed on an upper wall of the first case half 62 and projects upwards from the wall. The ambient air introduction passage 50 shown in FIG. 1, and more specifically, the first ambient air introduction pipe 50a portion of the passage is connected to the vent port 68.

The second case half 64 is formed in a cylindrical shape with an enclosed bottom, more specifically, in a cylindrical shape with three-tier stepped configuration. An annular flange 70 extends radially outward from the top of the upper end of the second case half 64. A plurality of fuel introducing holes 72 are formed at the first stepped part of the second case half 64 between the first (topmost) and second (middle) tiers. The fuel introducing holes 72 are arranged in a circumferential direction at equal intervals. The fuel introducing holes 72 are fluidly connected to the branch passage 42 shown in FIG. 1. A fuel exhausting hole 74 is formed on a bottom wall of the second case half 64, at the center of the wall, to which a return passage 46 shown in FIG. 1 is fluidly connected. A hollow cylindrical valve seat member 76 is attached to the lowermost third tier portion of the second case half 64, snugly fitting into the inner periphery of the circumference of the portion in a press fitting configuration.

As shown in FIG. 2, the pressure regulating valve 44 may include an annular plate-shaped diaphragm 78. An outer peripheral portion of the diaphragm 78, which extends radially outward, is interleaved between the flange portion 66 of the first case half 62 and the flange portion 70 of the second case half 64. In this interleaved arrangement, the flange portion 70 is secured in place as it is folded back onto the flange portion 66. As a result of the interleaved configuration, both case halves 62 and 64 are integrally coupled with each other with the diaphragm 78 disposed therebetween. The diaphragm 78 is made of a flexible rubber elastic material. Both flange portions 66 and 70 may be described as collectively defining a flange 80 extending from the outer peripheral portion of the casing 60. Further, an interior space of the casing 60 formed by the respective internal cavity spaces of the first case half 62 and the second case half 64 is horizontally partitioned by a diaphragm 78 into two upper and lower chambers, which may also be referred to as the backpressure chamber 82 and the pressure regulating chamber 84.

As shown in FIG. 2, a spring receiving member 86 and a valve holding member 88 are integrally coupled at the inner peripheral portion of the diaphragm 78 by being secured to opposite vertical sides of 78 with the diaphragm 78 is interleaved therebetween. A ball 92 fixed to a disc-shaped valve body 90 pivotally supports the valve holding member 88 in the pressure regulating chamber 84 via an engagement plate 94. A spring 96 configured as a coil spring is interleaved between a ceiling surface of the first case half 62 and an upper and radially outward surface edge of the spring receiving member 86 in the backpressure chamber 82. The spring 96 biases the valve body 90 toward a valve seat member 76 against which valve body 90 seats in a valve closing direction (downward direction in FIG. 2).

Hereinafter, an operation of the fuel supply device 10 will be described. As shown in FIG. 1, when the fuel pump 34 is driven, it takes the fuel from within the reservoir cup 32, supplies the fuel into the cup through the fuel filter 36, and pumps the fuel to the engine 16 through the fuel passage 40, the fuel port 54, and the fuel supply passage 14. A portion of the fuel discharged from the fuel pump 34 is introduced through the fuel passage 40 and the branch passage 42 into the pressure regulating chamber 84 of the pressure regulating valve 44. The pressure regulating valve 44 regulates the pressure of the fuel supplied to the engine 16 to maintain the pressure of the fuel at a predetermined pressure. In particular, ambient pressure is introduced from the outside of the hermetically sealed fuel tank 12 through the ambient air introduction passage 50 into the backpressure chamber 82 of the pressure regulating valve 44. When the force of the fuel pressure within the pressure regulating chamber 84 pushing upward is less than the compounded total force of the ambient pressure and the biasing force of the spring 96 pushing downward, then the valve body 90 remains in a closed state with the valve body 90 seated on the valve seat member 76 (see FIG. 2).

On the other hand, when the force of the fuel pressure within the pressure regulating chamber 84 pushing upward is greater than the compounded force of the ambient pressure and the resilient force of the spring 96, the valve body 90 transitions to an open state with the valve body 90 pushed upward and away from the valve seat member 76 (see FIG. 3). As a result, the fuel within the pressure regulating chamber 84 is discharged out of the pressure regulating valve 44 through the fuel exhausting hole 74 and is fed to the jet pump 48 through the return passage 46 shown in FIG. 1. In this way, the fuel pressure within the fuel passage 40 is adjusted in accordance with the total force of the ambient pressure and the resilient force of the spring 96 to a predetermined preset pressure value. The jet pump 48 transfers the fuel within the hermetically sealed fuel tank 12 and outside of the reservoir cup 32 into the reservoir cup 32 using the flow velocity of the fuel discharged out of the pressure regulating valve 44. The fuel is fed into the reservoir cup 32 accordingly. Arrows in FIG. 3 show the flow of the fuel when the pressure regulating valve 44 is opened.

According to the above embodiments, the ambient air present outside of the hermetically sealed fuel tank 12 is introduced through the ambient air introduction passage 50 into the backpressure chamber 82 of the pressure regulating valve 44 shown in FIG. 1. Therefore, even when the internal pressure of the hermetically sealed fuel tank 12 varies, the inside of the backpressure chamber 82 can be maintained at ambient pressure. As a result, the fuel pressure can be regulated at the aforementioned predetermined preset pressure value without being affected by the internal pressure of the fuel tank 12.

As shown in FIG. 1, the backpressure chamber 82 fluidly communicates with the ambient air collectively through the ambient air introduction passage 50, port 56, vapor passage 18, canister 20, and ambient air passage 22. Therefore, even if the fuel in the pressure regulating chamber 84 leaks into the backpressure chamber 82 by passing through the diaphragm 78, and is vaporized within the backpressure chamber 82, the fuel vapor may be adsorbed by the adsorbent materials filled in the canister 20 when the fuel vapor eventually passes through the ambient air introduction passage 50 and flows into the canister 20. Consequently, it is possible to prevent the fuel vapor from dissipating into the atmosphere.

As shown in FIG. 1, the ambient air introduction port 56 of the cover 52 also defines a part of the ambient air introduction passage 50. Specifically, via port 56, the ambient air introduction passage 50 passes through the cover member 52 and extends from within to the exterior of the hermetically sealed fuel tank 12. Having the port 56 in such a location, where the cover member 52 is removable from the tank 12 itself, provides easy facilitation of arrangement of the ambient air introduction passage 50 as compared to the case where the ambient air introduction passage 50 passes through another part of the hermetically sealed tank 12. As a result, since such an opening does not need to be additionally provided on a portion of the tank 12 surface itself, an increase in locations which would additionally need to be sealed can be avoided, thereby enhancing the hermetic sealing property of the fuel tank 12.

Figure 4:
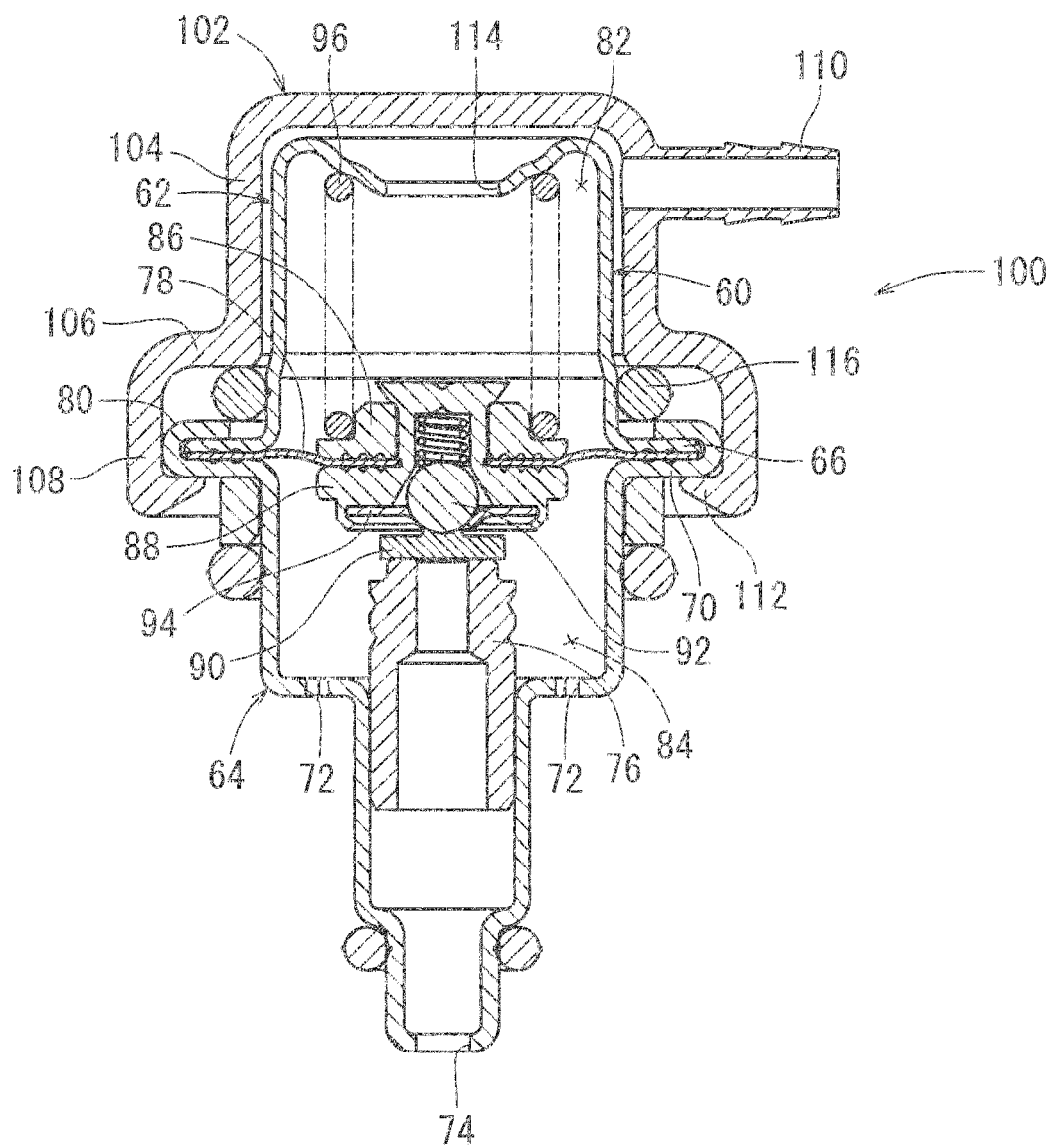
FIG. 4 is a cross sectional view of an embodiment of a pressure regulating valve in a closed state.

Another embodiment will be described with reference to FIG. 4. Hereinafter, distinguishing features of the embodiment of FIG. 4 with respect to the above-described embodiment will be mainly described but descriptions of common features will be omitted to avoid redundancy. The embodiment illustrated in FIG. 4 includes a vent port 110 instead of the vent port 68 shown in FIG. 2. FIG. 4 is a cross sectional view of the pressure regulating valve 100 in a closed state.

As shown in FIG. 4, the upper half of the casing 60 is covered by a cap 102 made, for example, of resin. The cap 102 is formed as a cylindrical shape with an enclosed top surface, which is in contrast to the top surface of first case half 62 in FIG. 2. More specifically, the cap 102 includes a smaller diameter portion 104 with a closed upper end and a larger diameter portion 108 extending radially outward relative to portion 104. Larger diameter portion 108 has a diameter larger than that of the smaller diameter portion 104.

The larger diameter portion 108 is positioned below the smaller diameter portion 104. The two portions form a two tiered configuration in which stepped portion 106 extends radially between the smaller diameter portion 104 and the larger diameter portion 108 to define a radially outward extending step between these portions. The smaller diameter portion 104 is connected to the inner radial peripheral edge of the stepped portion 106 while the larger diameter portion 108 is connected to the outer radial peripheral edge of the stepped portion 106.

As shown in FIG. 4, the vent port 110 protrudes radially outward from the circumferential lateral upper surface of the smaller diameter portion 104. The first ambient air introduction tube 50a of the ambient air introduction passage 50 shown in FIG. 1 is connected to the vent port 110 in this embodiment. An engagement portion 112 extends radially inwardly from the lower end of the larger diameter portion 108. The engagement portion 112 engages a flange 80 of the casing 60 in a snap-fit configuration. The casing 60 is press fitted in this manner into the cap 102 from the bottom of the cap 102 so as to lock the lock portion 112 at a lower surface of the flange 80. In this way, the cap 102 can be attached to the casing 60.

As shown in FIG. 4, a vent hole 114 is formed on the central, inner radial region of the upper wall of the first case half 62 of the casing 60. The backpressure chamber 82 of the pressure regulating valve 100 fluidly communicates with the ambient air introduction passage 50 through the vent hole 114 and the vent port 110. An annular 0-ring sealing member 116 made of rubber elastic material is interleaved between the casing 60 and the cap 102. The sealing member 116 is positioned on an upper surface of the flange 80 around the exterior circumferential periphery of the first case half 62 and below the lower end portion of the smaller diameter portion 104 and/or the lower surface of the stepped portion 106. The sealing member 116 serves to hermetically seal the gap between the outer surface of the casing 60 and the inner surface of the cap 102. Accordingly, the fuel vapor within the hermetically sealed fuel tank 12 is prevented from flowing into the ambient air introduction passage 50 through the gap.

As shown in FIG. 4, the backpressure chamber 82 ultimately communicates with the ambient air introduction passage 50 through the vent port 110 provided at the cap 102. Therefore, the shape of the casing 60 may be any shape as long as it allows the cap 102 to be attached such that ambient air is sealed as described above, and such that the casing of the conventional pressure regulating valve without the vent port 68 shown in FIG. 2 may also be used.

According to the above-described embodiments, as shown in FIG. 1, the ambient air introduction passage 50 may be connected to the vapor passage 18 downstream of the closing valve 24. Alternatively, the ambient air introduction passage may have other configurations provided such configurations allow the tank to communicate with the exterior atmosphere through the canister 20 in the manner described above. More specifically, such alternate configurations may entail the ambient air introduction passage 50 being directly connected to the canister 20, or where the ambient air introduction passage 50 is connected to the purge passage 28 upstream of the purge valve 30, i.e. between the canister 20 and the purge valve 30.

According to the above embodiment, as shown in FIG. 1, the ambient air introduction passage 50 may communicated with the exterior atmosphere through the canister 20. Alternatively, the ambient air introduction passage 50 may communicate with the exterior atmosphere thorough an added dedicated canister filled with adsorbent materials. The vent port 68 of FIG. 2, or the vent port 110 of FIG. 4, may be of any configuration as long as ambient air can be introduced into the back pressure chamber 82 through the ambient air introduction passage 50, and its position and extending direction may be appropriately changed.

The various examples described above in detail with reference to the attached drawings are intended to be representative of the present disclosure and are thus non limiting embodiments. The detailed description is intended to teach a person of skill in the art to make, use and/or practice various aspects of the present teachings and thus does not limit the scope of the disclosure in any manner. Furthermore, each of the additional features and teachings disclosed above may be applied and/or used separately or with other features and teachings in any combination thereof, to provide an improved hermetically sealed tank system, and/or methods of making and using the same.

What is claimed is:

1. A hermetically sealed fuel tank system, comprising:
   a hermetically sealed fuel tank;
   a fuel pump configured to supply fuel from within the fuel tank to an internal combustion engine;
   a pressure regulating valve disposed within the fuel tank and configured to regulate the pressure of the fuel supplied from the fuel pump to the internal combustion engine, wherein the pressure regulating valve includes a diaphragm, a pressure regulating chamber, and a backpressure chamber, wherein the pressure regulating chamber and the backpressure chamber are partitioned by the diaphragm; and
   an ambient air introduction passage in fluid communication with the backpressure chamber of the pressure regulating valve, wherein the ambient air introduction passage is configured to introduce air from the atmosphere outside the fuel tank into the backpressure chamber.

2. The hermetically sealed fuel tank system of claim 1, further comprising a canister configured to adsorb and desorb fuel vapor, wherein the ambient air introduction passage in fluid communication with ambient air in the atmosphere outside the fuel tank via the canister.

3. The hermetically sealed fuel tank system of claim 1, further comprising a cover covering an opening of the fuel tank, wherein a portion of the ambient air introduction passage is formed through the cover.

4. A hermetically sealed fuel tank system, comprising:
   a fuel tank with a fully enclosed surface except for a hole in an upper surface of the fuel tank;
   a cover member hermetically sealing said hole, wherein the cover member includes a fuel port and an ambient air introduction port, wherein the fuel port and the ambient air introduction port extend through the cover member;
   a fuel pump configured to supply fuel from within the fuel tank to an internal combustion engine;
   a pressure regulating valve disposed within the fuel tank, where said pressure regulating valve is configured to regulate the pressure of the fuel supplied from the fuel pump to the internal combustion engine, wherein the pressure regulating valve includes a diaphragm, a pressure regulating chamber, and a backpressure chamber, wherein the pressure regulating chamber and the backpressure chamber are partitioned by the diaphragm; and
   an ambient air introduction passage in fluid communication with the backpressure chamber of the pressure regulating valve, wherein the ambient air introduction passage is configured to introduce air from the atmosphere outside the fuel tank into the backpressure chamber.

5. The hermetically sealed fuel tank system of claim 4, wherein the ambient air introduction passage is configured to introduce air from the atmosphere outside the fuel tank into the backpressure chamber through the ambient air introduction port, and wherein the fuel tank does not include any orifices, holes, ports, or passages formed therein except for the hole covered by the cover member.

6. The hermetically sealed fuel tank system of claim 4, wherein the pressure regulating chamber and the backpressure chamber are formed of opposed press-molded halves of a cylindrical configuration, wherein each cylindrical configuration comprises a cylindrical shape with an open end and a closed end, wherein a top of one of the opposed press-molded halves comprises the closed end and a bottom of one of the opposed press-molded halves comprises the closed end.

7. The hermetically sealed fuel tank system of claim 6, wherein the open end of each cylindrical shape comprises outwardly extending radial flanges which are joined to each other in a fixed manner facing oppositely in the vertical direction, such that the joining of the pressure regulating chamber and the backpressure chamber results in a single chamber of a hollow casing with the diaphragm horizontally oriented between the pressure regulating chamber and the backpressure chamber.

8. The hermetically sealed fuel tank system of claim 4, further comprising a canister configured to adsorb and desorb fuel vapor, wherein the ambient air introduction passage is in fluid communication with ambient air in the atmosphere outside the fuel tank via the canister.

9. The hermetically sealed fuel tank system of claim 4, wherein the canister is positioned outside the fuel tank and is in fluid communication with the fuel tank via the ambient air introduction passage.

10. The hermetically sealed fuel tank system of claim 4, wherein a fuel passage includes piping connecting a fuel outlet port located at an upper surface of the fuel pump through the fuel port of the cover member to the internal combustion engine, where the internal combustion engine is located outside the fuel tank.

11. The hermetically sealed fuel tank system of claim 10, wherein a branch passage branching off from the fuel passage fluidly connects the fuel passage to the pressure regulating chamber of the pressure regulating valve.

12. The hermetically sealed fuel tank system of claim 11, further comprising a return passage extending downward from the pressure regulating chamber of the pressure regulating valve to a jet pump adjacent to a reservoir cup.

13. The hermetically sealed fuel tank system of claim 4, wherein the pressure regulating valve includes a spring in the backpressure chamber, wherein the spring biases the diaphragm towards the pressure regulating chamber.

14. The hermetically sealed fuel tank system of claim 12, wherein the pressure regulating valve includes a spring in the backpressure chamber, wherein the spring biases the diaphragm towards the pressure regulating chamber.

15. The hermetically sealed fuel tank system of claim 14, wherein when the force of the pressure within the pressure regulating chamber is greater than the compound force of the ambient pressure and the biasing force of the spring present in the backpressure chamber of the pressure regulating valve, then fuel within the pressure regulating chamber is discharged out of the pressure regulating valve into the return passage and is fed to the jet pump.

16. The hermetically sealed fuel tank system of claim 15, wherein the jet pump is configured to transfer fuel into the reservoir cup using the flow velocity of fuel discharged out of the pressure regulating valve.

17. The hermetically sealed fuel tank system of claim 8, wherein the canister is filled with adsorbent materials in its interior.

18. The hermetically sealed fuel tank system of claim 17, wherein the canister is filled with activated carbon.

19. The hermetically sealed fuel tank system of claim 16, wherein the fuel pump is submerged in the reservoir cup, and wherein the fuel pump is configured to receive the fuel transferred into the reservoir cup by the jet pump.

20. The hermetically sealed fuel tank system of claim 19, wherein a fuel filter is provided at said inlet port, wherein the fuel filter is configured to filter out impurities when fuel from the reservoir cup is pumped by the fuel pump.

* * * * *